United States Patent Office 2,840,480
Patented June 24, 1958

2,840,480

REFRACTORY COATING FOR GRAPHITE MOLDS

Stephen D. Stoddard, Los Alamos, N. Mex., assignor to the United States of America as represented by the United States Atomic Energy Commission No Drawing. Application August 16, 1954
Serial No. 450,280

2 Claims. (Cl. 106—38.27)

The present invention relates to the manufacture of foundry mold coatings and more particularly to an improved refractory coating for graphite molds used in the casting of uranium, uranium alloys and other metals.

The vacuum casting of uranium and uranium alloys is most generally accomplished by the use of graphite molds in which the mold cavity has been coated with a refractory material. Such a coating is necessary in the casting of uranium and other metals, such as nickel, having a high affinity for carbon, in order to separate the molten metal from the surface of the graphite due to the wetting power of the metal and its carbon affinity. If no separation is provided and there is contact between the graphite mold and the uranium, or other metal being cast, the metal will be contaminated by carbon pickup and the cavity surface will be irreparably damaged as the casting is removed from the mold. In the state of the art prior to the present invention, the refractory material most commonly used as a mold coating has been magnesium oxide applied as a slurry. However, certain difficulties are inherent in the use of magnesium oxide for this purpose. It is relatively difficult to apply, and a surface on the casting which is rougher than desirable usually results. In addition, magnesium oxide as a slurry has a short pot life, i. e., approximately one and one-half hours, thus making its immediate use necessary.

The present invention is an alumino-silicate refractory composition, which may be used as a mold surface in solid form or as a coating applied to the cavity of a graphite mold, comprising a mixture of ball clay, kaolin, alumina cement, alumina, water, sodium silicate and sodium carbonate in specific proportions as described hereinafter.

It is an object of the present invention to provide an improved refractory mold coating for graphite molds especially useful in the casting of uranium, nickel and other metals having a high affinity for carbon.

It is another object of the present invention to provide an improved refractory mold coating for graphite molds used in the casting of metals such as nickel, cobalt and their alloys when the complexity of the casting makes the use of graphite molds necessary.

It is a further object of the present invention to provide a refractory mold material or mold coating for graphite molds which has a long or indefinite pot life.

It is a still further object of the present invention to provide an improved refractory mold coating for graphite molds which is easily applied to the casting surface of such molds.

Other objects and advantages of the present invention will be apparent to those skilled in the art from the following description of a preferred embodiment.

A typical mill charge of the alumino silicate refractory coating in its presently preferred embodiment comprises the following mixture by weight of the dry ingredients: Kentucky ball clay 11.97 parts, Georgia kaolin 17.96 parts, alumina cement 59.84 parts, 200 mesh calcined alumina 9.97 parts, sodium silicate powder 0.22 parts, sodium carbonate 0.08 parts and water 32 parts of the weight of the dry mixture. In the presently preferred embodiment an alumina cement comprising 93 percent $Al_2O_3$, 4 percent $SiO_2$ and 2 percent $K_2O$ was satisfactorily used, the $SiO_2$ and $K_2O$ being combined with a portion of the $Al_2O_3$ as a clay bond and the remaining $Al_2O_3$ being the fines of fused alumina. Satisfactory results are also obtained when the sodium silicate in the above mill charge is about 0.2 part and the sodium carbonate is about 0.1 part, good results being obtained when the latter is varied from a trace up to a maximum of about 0.1 part. Other soluble silicates may be used in the same weight proportion in place of the sodium silicate and other soluble carbonates may similarly replace the sodium carbonate. The above mixture is milled and fired by techniques well known to the art to provide a solid casting mold or it may be sprayed or slush applied to a graphite mold cavity.

As an example of the preparation of the refractory coating of the present invention and its use in a typical casting operation the following procedure is illustrative.

In utilizing the mill charge given hereinbefore, a dry mixture is prepared comprising 240 grams of air floated Kentucky ball clay, 360 grams of air floated Georgia kaolin, 1200 grams of alumina cement, 200 grams of 200 mesh calcined alumina, 4.56 grams of sodium silicate powder and 1.56 grams of sodium carbonate. The mixture is then milled for two hours in a porcelain ball mill of 2000 grams capacity, using 4200 grams of three-quarter inch and one-half inch diameter balls. The mixture is passed through a 325 mesh screen and shows a grain size of 2.1 microns. The mixture is then mixed with 640 cc. of water and applied to the casting surface of the graphite mold which may be, for example, cylindrical in shape. The mold coating in this illustration is sprayed onto the graphite mold, which has been pre-cleaned, with air brush having a carboloy tip with an air pressure of 40 to 60 pounds per square inch. The mold coating dries upon contact, and is applied to a thickness of 0.010 to 0.015 inch. The mold with coating applied is pre-heated to 1375° C. for a nickel pour. The nickel is poured at a temperature of 1450° C. to 1500° C. and freezes almost immediately. The nickel casting may then be removed, leaving the mold coating intact and the mold ready for reuse. The nickel casting shows a smooth surface with no carbon pickup.

In the presently preferred embodiment, a kaolinitic clay of the sedimentary type found in Georgia and North Carolina was used, although other amorphous varieties of $Al_2O_3 2SiO_2 2H_2O$, such as the residual primary kaolins of North Carolina, are also satisfactory. The finer grain structure and higher plasticity of the secondary kaolins make them preferable. Although the limits of kaolin as a constituent of the mixture are not strictly defined, it has been found that the percent of kaolin in the mixture may vary from 10 percent to 25 percent by weight to yield satisfactory results.

Although in the typical mill charge specified above, Kentucky ball clay was used, other white-or-light-cream-burning clays which represent the maximum degree of subdivision and the highest degree of plasticity of the fired clay materials may be employed. Ball clays such as those found in Dorsetshire, England, southwestern Kentucky and Tennessee are satisfactory. It is preferable that the ball clay used be of the air floated type from the standpoint of particle size, purity and uniformity. In the presently preferred embodiment, approximately 12 percent by weight of ball clay was used in the dry mixture. However, the percent of ball clay may vary from 5 percent to 20 percent with little or no detrimental effects.

The alumina cement employed in the presently preferred embodiment is a high purity alumina base cement, being the fines of fused aluminum oxide bonded with clay. This material is sold under various trade names, such as the well-known trademark "Alundum." The grade of purity of the Alundum cement is not critical and the lowest of the three degrees of purity (95 percent $Al_2O_3$) may be satisfactorily used. The alumina cement constituent may be varied considerably with little effect on adherence and bonding strengths. It has been found that the percent of alumina cement may be varied in the range of 30 percent to 60 percent to achieve the desired results.

The alumina of the mixture is preferably the artificially formed fused $Al_2O_3$ used in industrial porcelain which is acid leached free of iron. However, other forms of $\alpha$-alumina, $\beta$-alumina or $\gamma$-alumina are acceptable. The alumina should be calcined and pass a 200 mesh screen. Further, it is desirable that the alumina be granular to permit the requisite porosity. The proportion of alumina in the mixture may vary from 5 percent to 35 percent.

Proportions of alumina cement and calcined alumina stated hereinbefore, may be varied according to the desired characteristics of the coating. For example, the mixture given as a typical mill charge shows a strong tendency to adhere to the surface of a graphite mold. Although this is desirable in most instances, it may sometimes be necessary to remove the coating from the graphite surface. In such case, the alumina cement, being the prime cementing agent, may be decreased and the alumina proportionately increased.

The water content and sodium salt of the mixture are held to close tolerances due to their decided effect on the viscosity of the mixture and consequent ease of application. The sodium silicate therefore may vary from 0.1 percent to 0.5 percent while the sodium carbonate may vary from a trace to 0.1 percent. The exact percentage of silicate and carbonate salts is dependent upon the proposed use and desired viscosity of the coating material, and is easily determined by routine experiment. Other silicate and carbonate salts such as potassium silicate and potassium carbonate may obviously be used in place of the sodium salts, although the viscosity of the mixture will thereby be altered.

Although the water content of the mixture is held to close tolerances for any given viscosity, the water content may vary appreciably according to the method by which the coating is to be applied. Thus, where the coating is to be slush applied, the water content may vary from 25 percent to 40 percent based on the dry weight of the mixture in order to facilitate coating of blind corners and relatively inaccessible areas.

The alumino silicate refractory coating of the present invention has proved superior both in process and product to those refractory coatings heretofore known to the art and is especially useful in the casting of metals such as aluminum, nickel, uranium 235 and uranium 238, since these pouring temperatures do not usually exceed 1500° C.

It may be sprayed in thinner applications than magnesium oxide and results in a product of cast uranium or other metal having a smoother surface than was heretofore possible by the use of magnesium oxide. It is easier to apply and shows less tendency to clog and foul the spray gun when spray application is used. Its pot life is indefinite as compared to the short pot life of a magnesium oxide coating, and it shows better adherence characteristics than those previously known coatings. The stronger adherence to graphite of the present alumino silicate coating makes possible repeated use of graphite molds coated therewith, while magnesium oxide coatings heretofore known to the art are most generally not re-usable after one casting, due to flaking and chipping of the coating from the graphite surface.

It will be apparent to those skilled in the art that this invention is not necessarily limited to the particular embodiments described herein but that various modifications may be made without departing from the scope of the invention as set forth in the appended claims.

What is claimed is:

1. An alumino silicate refractory mold coating consisting essentially of an aqueous slurry of a mixture by weight of the dry ingredients of about 12 parts ball clay, about 18 parts kaolin, about 60 parts alumina cement, about 10 parts fused alumina, about 0.2 part soluble silicate salt and not more than 0.1 part soluble carbonate salt, all of said ingredients having an average particle size of 2.1 microns and a maximum of 44 microns.

2. An alumino silicate refractory mold coating consisting essentially of an aqueous slurry of a mixture by dry weight of about 12 parts ball clay; about 18 parts kaolin; about 60 parts alumina cement, said alumina cement being the fines of fused aluminum oxide bonded with clay; about 10 parts fused alumina; about 0.2 part powdered sodium silicate; and about 0.1 part sodium carbonate, all of said ingredients having an average particle size of 2.1 microns and a maximum of 44 microns.

References Cited in the file of this patent

UNITED STATES PATENTS

| | | |
|---|---|---|
| 1,318,838 | Braun | Oct. 14, 1919 |
| 2,144,532 | Hall | Jan. 17, 1939 |
| 2,311,228 | Heany | Feb. 16, 1943 |
| 2,419,290 | Schaefer | Apr. 22, 1947 |
| 2,675,324 | Busby et al. | Apr. 13, 1954 |
| 2,685,528 | Robinson | Aug. 3, 1954 |

FOREIGN PATENTS

| | | |
|---|---|---|
| 370,864 | Great Britain | 1930 |

OTHER REFERENCES

Searle: "Refractory Materials," pub. 1950, London, by Griffin Co. (pp. 106, 502, 733, 736).